United States Patent Office 3,200,369
Patented Aug. 10, 1965

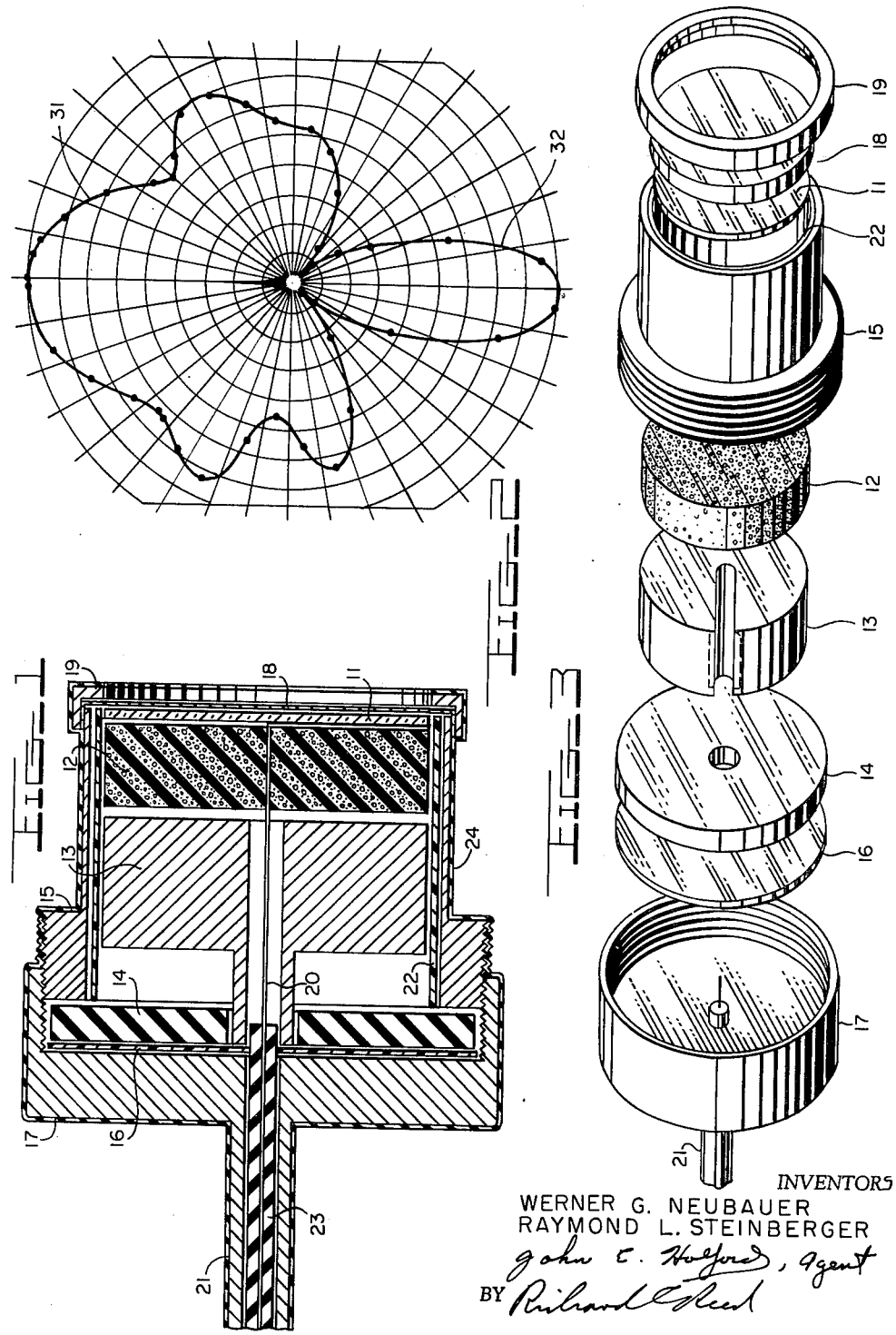

3,200,369
MINIATURE UNDERWATER SOUND
TRANSDUCER
Werner G. Neubauer, 417 S. Abingdon St., Arlington 4, Va., and Raymond L. Steinberger, 1200 Janneys Lane, Alexandria, Va.
Filed June 29, 1961, Ser. No. 120,798
8 Claims. (Cl. 340—10)
(Granted under Title 35, U.S. Code (1952), sec. 266)

The invention described herein may be manufactured and used by or for the Government of the United States of America for governmental purposes without the payment of any royalties thereon or therefor.

The present invention is directed to underwater sound transducers. More particularly the invention is directed to a miniature transducer for converting sound energy to electrical energy or the reverse, i.e., transducers having radiating faces ⅛ inch in diameter or less.

Transducers for producing sonic vibrations in fluids have been found useful in many diverse fields of endeavor. Perhaps the best known is its use in military sonar as pulse echo search equipment. This same equipment makes a very valuable safety device for navigation in shallow water, where underwater obstacles are likely to occur. This type of equipment may also be used for mapping underwater contours with great speed and accuracy.

Industry and the medical profession have also benefited from the use of sound transducers. Many articles of manufacture are subjected to severe vibration tests by means of sound transducers. Ultrasonic cleaning both cleans and disinfects similar articles without the use of harsh chemicals.

In purely medical applications sound waves have long been used for massage; now sound waves are used to take pictures of internal organs much as X-rays photograph bones.

Miniature transducers are also inserted within the body to monitor sounds and pressure associated with vital organs. Ultrasonic cutting tools, employing liquid suspensions of abrasive materials have been used both in dentistry and in industry.

The size of various transducers varies with the application to which they are put. Low frequency transducers are generally made very large in order to obtain the proper resonant frequency. These devices also generally employ heavy electromagnetic motors, which make them quite cumbersome. Such transducers, however, are capable of placing a great deal of sound energy in a fluid, and propagation losses are small even over long distances. High-frequency transducers usually employ crystal motors. These tend to be more compact and are cheaper to manufacture.

Small transducers, per se, have a special utility which is widely recognized by those skilled in the art. Such transducers, when operated at the proper frequency, effectively become a point source. Thus, when they are used in reflection tests, the direction of various sound rays emitted by the transducer can easily be traced. In certain test set-ups, the effect of low frequency sound on various targets at long ranges may easily be simulated in the laboratory by scaling down the distances and target sizes and simultaneously raising the frequency, so that the wavelength dimensions of these quantities remains constant. Ultimately, this leads to miniature high-frequency transducers. Such transducers are also required in great numbers for very accurate and powerful beam formation in short range high resolution sonar equipment. Used as a monitor, a miniature transducer may be placed in the near field of an average transducer without disturbing its directivity.

The smaller transducers presently available have many shortcomings. Most are encased in a thin layer of an elastomer, which is not entirely impervious to water. Most produce poor radiation patterns with ragged front lobes and excessive back radiation. The manner in which they are constructed makes them difficult or impossible to repair. Thus a cracked crystal or a broken connection results in scrapping the entire unit. Many are sensitive to lateral movement, producing false indications of pressure changes directed on the face of the transducer.

The difficulty of overcoming these disadvantages is chiefly due to the small size which requires that new techniques be employed in manufacture and maintenance. High powered optical magnifiers must be used to insure proper placement of parts, for example.

An object of the present invention is, therefore, to provide a miniature sound transducer which is impervious to water even though subjected to prolonged submersions, is easy to disassemble for repair, is substantially insensitive to lateral movement, and produces a substantially uniform unidirectional radiation pattern.

These and other objects of the invention are best understood in reference to the accompanying drawings wherein;

FIG. 1 shows a side view of the miniature transducer of the invention in section;

FIG. 2 shows the radiation pattern from an early model of the transducer; and

FIG. 3 shows an exploded view of the transducer of FIG. 1.

Referring to FIG. 1, there can be seen the general construction of the invention. A piezo-electric crystal motor 11 is mounted in the front of the transducer. Behind the crystal motor is an absorbing pad 12 and a spacing block 13. Surrounding the rear end of the spacing block is a sealing washer 14. A housing 15 surrounds the crystal motor, absorbing pad and spacing block. An electrical insulating washer 16 abuts the rear face of the sealing washer 14 and a sealing cap 17 covers both washers being attached at its periphery to the housing 15 to close the rear of the transducer. A conduit 21 is integrally connected to the sealing cap to carry the signal conductor 23 and mechanically support the assembly. The radiating face of the crystal motor is covered with a foil diaphragm 18 which overlaps the forward edge of the housing. A ring cap 19 is placed over the forward edge of the housing over-lapping the annular front and outer cylindrical walls of the housing and the foil diaphragm to hold the latter in place. The foil is thicker than the spacing between the ring cap and the housing to provide a tight seal.

Each of the members behind the crystal motor contains a central aperture through which extends a wire 20 covered with insulation 23. An isolating sleeve 22 separates the crystal, absorbing pad and spacing block from the housing 15, and an isolating coating 24 surrounds the housing 15, the sealing cap 17 and, if necessary, the conduit 21 to damp any radiation from these members.

The shape of the various members is more easily determined with reference to FIG. 3. The crystal 11 is a thin flat disc and the absorbing pad 12 is shaped like a cylinder of substantially the same diameter. The forward end of the spacing block is a large cylinder while the rear portion of the block 13 is relieved to provide a cylindrical stem of lesser diameter. Both cylinders are slotted along an axial plane to the center of the member. The sealing washer 14 has an outer diameter slightly larger than the adjacent end of the housing 15 and a central aperture of sufficient diameter to admit the stem of the spacing block. The insulating washer 16 has an outer diameter substantially equal to the above mentioned adjacent end of the housing and a central aperture less than the diameter of the stem of the spacing block and approximately equal to the overall diameter of the wire insulation 23.

The housing 15 is a thin walled hollow cylinder with an expanded flange portion at its rear end. The isolating sleeve 22 fits snugly within the housing and may even be a coating thereon, if desired. The inner diameter of the isolating sleeve is only slightly larger than the diameter of the crystal motor, absorbing pad and spacing block to provide a snug but sliding fit. The expanded flange at the rear of the housing is threaded to provide a male coupling. The sealing cap is cup-shaped to provide an inner recess; the cylindrical sides of which are provided with internal screw threads to mate with those on the expanded flange portion of the housing. The ring cap has a plane annular wall joined at its outer periphery to a cylindrical wall which slides fairly snugly over the forward edge of the housing.

To assemble this device the conduit 21 is first firmly attached within the aperture in the sealing cap by sweating or cementing. The wire 20 is then inserted through the conduit, and the insulating washer 16 is pressed into place over the insulation of the wire. Next the sealing washer 14 is pressed into the sealing cap over the insulating washer to firmly hold the latter in place. At this point in the assembly process the electrical insulation may be stripped from the front end of the wire 20 commencing from a point spaced from the washer 16, preferably a point that will fall about midway along the spacing block 13. The spacing block is inserted next, threading the stripped end of wire 20 through the center aperture. The bare end of wire 20 is then forced through the approximate center of absorbing pad 12 and bent at right angles so as to lie along the front surface of the pad. If the wire is relatively stiff, a thinner wire or foil ribbon is threaded through the pad and electrically connected to the wire, or both are pressed between the pad and spacing block.

The front portion of the transducer is assembled separately from the portions of the transducer discussed above. The insulating sleeve 22, if not a coating, is first inserted in the housing 15. The foil diaphragm 18 is next shaped to fit over the front of the housing. With the foil in place, the ring cap 19 is snapped on, stretching the diaphragm smoothly over the open front end of the housing. A drop of castor oil may then be placed on the inner face of the diaphragm. The crystal motor is placed against this same inner face with a rotating motion to force out excess oil and bring a considerable portion of the motor and diaphragm surfaces into electrical contact.

At this point the ease of assembly or disassembly for repair is evident. The front portion thus assembled is easily attached to the remaining parts by means of the threaded portions on the housing and sealing cap. Any excess length of the conductor 20 or a flexible extension thereof may coil harmlessly within the spacing block as the threads are engaged. Since no cement is used, the transducer is easily dismantled for repair. The diaphragm 18, being thicker than the space between the ring cap and the housing, is deformed or cold worked slightly, but this portion need not be removed to gain access to other parts. The diaphragm may easily be replaced, if necessary. The outer coating 24 may be premolded to slightly smaller dimensions than the transducer and stretched into place.

The foil, the ring cap, the housing, the sealing cap, and the conduit are preferably all made from a gold alloy or other suitable ductile metal to resist chemical attack and penetration by the seawater medium in which the transducer is to be used. The diaphragm, in one embodiment, is made from silver, plated with gold. Their small size makes the use of such precious metals economically feasible. The insulating washer 16 and isolating sleeve 22 may both be made of polytetrafluoroethylene or similar poor conductor of sound and electricity. The sealing washer 14 is conveniently made from polychloroprene. The spacing block 13 is easily machined from brass. The pad is cut or molded from foam rubber or similar sound absorbing material. In some cases it may be desirable to flood the interior of the transducer with a chemically compatible non-conducting liquid, e.g. castor oil.

The crystal motor is made from material which exhibits piezo-electric effects only due to changes in its thickness dimension, rather than the volume. A suitable material for this purpose is lead-zirconate. Other suitable materials which can be used are ammonium dihydrogen phosphate, barium titanate, and lithium-sulfate-monohydrate. The opposite faces of the crystal motor are plated with silver to provide suitable electrical terminals. The outer coating 24 of the transducer is made from any material which will absorb and/or provide a large impedance mismatch to sound propagating in the surrounding liquid medium. Such materials include foamed rubber, and plastics, which have sound absorbing properties and impedances much lower than that of seawater, as well as rubber loaded with heavy particles such as iron or lead to provide a higher impedance than the surrounding medium.

FIG. 2 shows a plot of the relative gain of the transducer as a function of the angle of received or transmitted sound, as measured with an original model of the transducer not having the outer coating 24 shown in FIG. 1. When the outer coating was applied to the housing, sealing cap, and conduit the back lobe 32 disappeared and the front lobe 31 was considerably smoother. When the pattern was replotted in db little dissymmetry in the pattern could be detected.

The dimensions of the elements of the FIGS. 1 and 3 are greatly exaggerated for clarity. The original model of the transducer was very slightly greater than a quarter inch in length and less than a quarter inch in diameter. The spacing of the elements is similarly distorted, the actual elements being snug or compressed. The following table gives the dimensions of the elements used in the original transducer; a second model has been constructed using only half these dimensions and which yielded an equally satisfactory pattern of directivity.

*Table A*

| | Inches |
|---|---|
| Housing: | |
|     Outside diam. max. | 0.190 |
|     Outside diam. min. | 0.156 |
|     Inside diam. | 0.136 |
|     Length | 0.250 |
|     Flange thickness | 0.0625 |
| Sealing cap: | |
|     Outside diameter | 0.216 |
|     Length | 0.125 |
|     Rear wall thickness | 0.0625 |
| Ring cap: | |
|     Outside flange diam. | 0.168 |
|     Inside flange diam. | 0.158 |
|     Length | 1/32 |
|     Front aperture diam. | 0.125 |
| Conduit: | |
|     Inside diam. | 0.034 |
|     Outside diam. | 0.0625 |
| Spacing block: | |
|     Outside diam. max. | 0.125 |
|     Outside diam. min. | 0.0625 |
|     Inside diam. | 0.040 |
|     Length | 0.200 |
| Insulating washer: | |
|     Outside diam. | 0.186 |
|     Inside diam. | 0.030 |
|     Thickness negligible. | |
| Sealing washer: | |
|     Outside diam. | 0.200 |
|     Inside diam. | 0.063 |
|     Thickness | 0.062 |
| Absorbing pad: | |
|     Diameter | 0.125 |
|     Thickness | 0.125 |

*Table A*—Continued

Crystal motor:
  Diameter _____ 0.125
  Thickness _____ 0.009
Wire, A.W.G. #30.

These transducers have operated satisfactorily to a frequency of 100 kc. and below 25 kc., the limit of the test equipment employed. Since the transducer represents a capacity load, there will be a low frequency limit to its operation. It is expected, however, that these transducers will be effective at frequencies at least as low as one kilocycle.

Obviously many modifications and variations of the present invention are possible in the light of the above teachings. It is, therefore, to be understood that within the scope of the appended claims the invention may be practiced otherwise than as specifically described.

What is claimed is:

1. A miniature sound transducer comprising, a hollow tubular housing having open front and rear ends, a rigid sealing cap substantially covering said rear end, a crystal motor positioned within said housing at said front end, a sheet of highly ductile metal foil extending across said front end in contact with the front of said crystal motor, a ring cap surrounding the front end of said housing and spaced therefrom less than the thickness of said sheet, said sheet being cold worked between said ring cap and housing.

2. The transducer according to claim 1 including a pad of sound absorbing material positioned in said housing contacting the rear face of said crystal motor and means within said housing for maintaining said pad in a compressed state.

3. The transducer according to claim 1 including a layer of electrical isolating material covering the internal wall of said housing and sealing cap, said isolating material having sound propagating constants substantially different than that of said housing.

4. The transducer according to claim 1 wherein the component parts are generally cylindrical in shape and aligned on a common axis of revolution.

5. The transducer according to claim 1 where said foil is composed at least in part of gold alloy.

6. The transducer according to claim 1 wherein said foil is composed of silver, plated with gold.

7. The transducer according to claim 1 wherein said housing, said ring cap and said foil are composed of a gold alloy.

8. The transducer according to claim 1 wherein the exterior surfaces of said housing, said sealing cap and said ring cap are substantially covered with a material having markedly different sound propagating properties, whereby sound transmission through these members is suppressed.

References Cited by the Examiner
UNITED STATES PATENTS

| | | | |
|---|---|---|---|
| 1,800,573 | 4/31 | Skala _____ | 179—181 |
| 2,371,453 | 3/45 | Linell _____ | 179—114 |
| 2,705,263 | 3/55 | Schoeneberg _____ | 179—114 |
| 2,803,129 | 8/57 | Bradfield. | |

CHESTER L. JUSTUS, *Primary Examiner.*